Patented Sept. 15, 1953

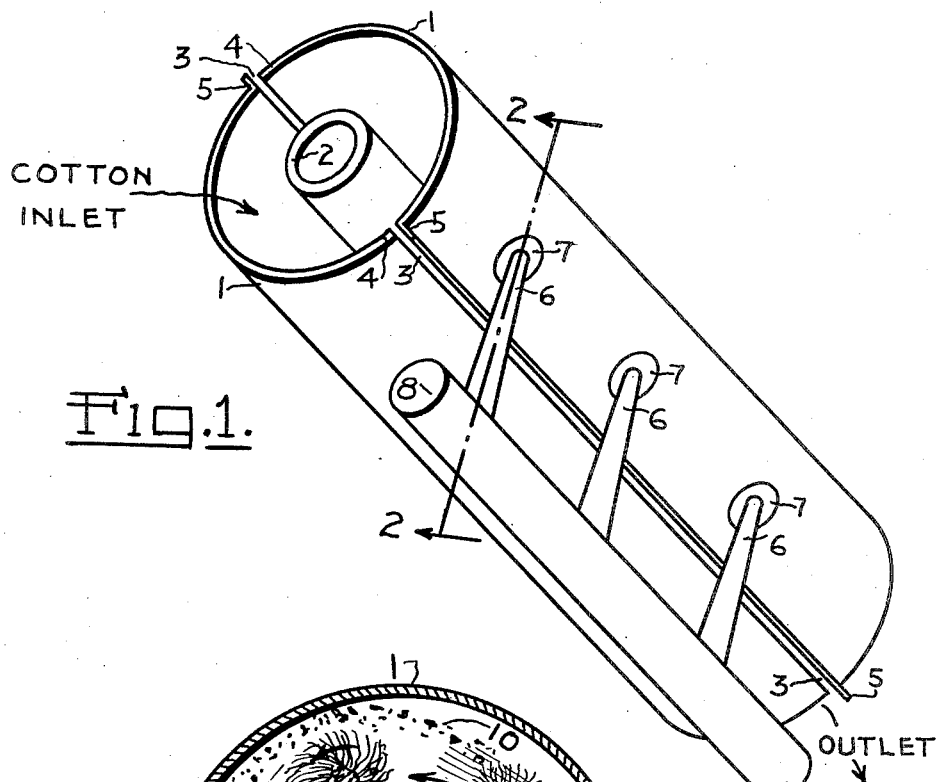
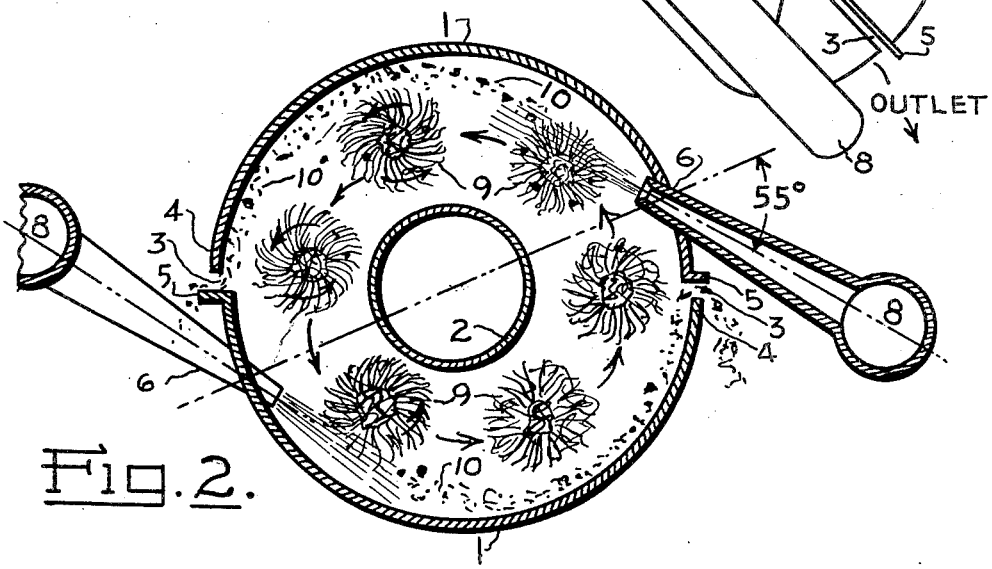

2,651,812

UNITED STATES PATENT OFFICE 2,651,812

COTTON TURBO-CLEANER PROCESS

David G. Black, Pataskala, Ohio, assignor, by mesne assignments, to the United States of America as represented by the Secretary of Agriculture Application August 11, 1950, Serial No. 180,230

2 Claims. (Cl. 19—72)

This invention relates to an improved process for cleaning seed cotton by the application of heretofore unused principles of air jet turbulence combined with cotton lock inertia. It also relates to a unique apparatus combining a skimmer type slot, concentric cylinders, and an annular area between the same, wherein a plurality of small air jets operate to clean the cotton.

The purpose of this invention is to provide a process of cleaning that is superior to the centrifugal and screening methods that have heretofore been used.

Prior to this invention seed cotton has been conveyed in bulk streams through pipes by means of air volumes ranging from 5 to 50 cubic feet of air per pound of seed cotton. At points of cleaning it has been crudely blown into screened beater cleaners without controlled action upon individual locks of seed cotton.

This invention employs small jets of air under pressure, wherein the size of the jet is of the order of $\frac{1}{10}$ or less the size of a cotton tuft. The air speed is of the order of 500 to 800 ft. per sec. with total pressure of 2½ to 5 lbs. per square inch gauge. This is unique and is a worthwhile improvement in cotton cleaning because the smallness of the jet permits cleaning to occur while the tuft of seed cotton is slowly accelerating under the action of the jet. That is to say, cleaning is achieved independently of the usual means of beating and scrubbing on screens, being caused by the differential motion of the air and the cotton tuft. This action is at a maximum for given jet air speeds when the cotton tufts move slowly. It has been observed that the smallness of the jets enhances the effective time during which this cleaning process continues.

The invention also utilizes a skimmer louvre which acts quite differently from a cotton cleaning screen. The paths of the seed cotton and trash, after disentanglement by the jets, tend to separate with the trash closer to the outer wall of the turbo cylinder, where this foreign matter may be skimmed off. The cotton tufts of larger dimension travel with their mass centers farther from the said outer wall; thereby achieving a unique separation that is neither centrifugal nor screening as now known in the art.

One embodiment of the invention is disclosed in the drawings in which:

Figure 1 is an isometric elevation of one application of the cotton turbo cleaner; and Figure 2 is a section thereof taken on line 2—2 in Figure 1, showing diagrammatically the observed action of cotton tufts and foreign matter during the operation of this cotton turbo-cleaner.

A cylindrical split turbo shell, made of two half cylinders 1, comprises the principal body of the unit. It is shown in Figure 1 at a slope of 45 degrees, whereby seed cotton may spiral from the upper inlet to the lower outlet under action of gravity and the herein described jet action.

The half cylinders 1 are symmetrically assembled, being supported by suitable means not shown, to provide two longitudinal skimmer slots 3. Concentrically disposed within the cylindrical split turbo shell is the smooth-surface central sleeve 2, that is rigidly positioned by suitable means, not shown. Sleeve 2 may be supported by any conventional means such as end plates or braces, or the like. This is conventional in cyclone separator devices. The drawing is schematic; the support means is not shown, for clarity.

The said skimmer slots 3 are formed to provide an offset relation of approximately ⅛ inch between the smooth edge 4 of the half cylinder 1 and the stand-out lip, or flange 5 of the adjacent half, so as to form a distinct obstructing ledge within the cylinder at each orifice.

At opposite symmetrical positions on each half cylinder 1 beyond each orifice 3, in counter-clockwise relation, the longitudinally aligned turbo pressure nozzles 6 are inserted in openings 7. The axis of each nozzle 6 makes an angle of about 55 degrees with the diameter of the cylinder passing through the intercept of the cylinder and the nozzle, as shown in the drawing.

Cross-sections at tips of said nozzles 6 are ⅛ inch in diameter, having an area of .01227 square inch, preferably. The number of nozzles and their spacings are functions of the turbo shell diameter, volume of cotton to be handled, and cycles of cleaning to be performed.

Air conduits 8 supply compressed air at from 2½ to 5 p. s. i., the lower range of pressure appearing to be more desirable.

Referring now to the operation of the subject invention, locks 9 of seed cotton are introduced into inlet of the turbo shell where they are given a slow spiral movement about the center sleeve 2 by the compressed air jets issuing from the nozzles 6. Since the size of the cross-section of the jet is of the order of approximately $\frac{1}{10}$ the size of a cotton lock, ranging from .003 to .0276 square inch, the pneumatic action of the jet effectuates a cleaning, the lock being held against the jet by its own inertia. The jet action then gradually produces a rotary or whirling motion to a limited degree, but it performs a cleansing action on the cotton lock that is independent of any subsequent scrubbing and agitating elsewhere in the turbo shell than in the region of said jets 6.

From our research investigations in pneumatic cleansing of cotton locks, it has become evident the use of the small size jet is a radical departure from any previously known practices, and that it produces a uniquely effective cleaning due to the differential motion of the air and the cotton lock. Thus, a longer cleaning process ensues per lock as the jet is made smaller, within reasonable limits, for a given air speed from the nozzle.

It will be further seen that the mass centers of the moving cotton locks are further away from the shell halves 1, than are the dislodged particles of trash 10 that have been freed from the lock. The action of the skimmer slots 3 thus differs widely from the operation of a screen or beater lip, because the trash 10 is siphoned out of the cylinder at these slots without tendencies for the outboard fibers of locks becoming jammed or caught on the ledges 5.

In the application of this invention to the processes of cleaning seed cotton, it should be understood that the several elements of nozzle number, jet pressure, slope of turbo shell, relationship in size of cylinders and methods of passing the seed cotton through the device may be varied without departing from the spirit of the invention.

The process can be carried out in other types of apparatus obvious to persons skilled in the art.

Having thus described my invention, I claim:

1. A process of cleaning seed cotton employing differential motion of air jets and cotton tufts, comprising: introducing the cotton tufts into an annular air zone; therein impinging the tufts with high velocity jets of air that are under pressure, have a diameter less than that of the tufts, are disposed at an angle to the diameter of the annular zone, and are directed toward and along the periphery of said zone; permitting the tufts to descend under gravity in said air zone as they are repeatedly impinged by said air jets, thereby causing the tufts to circle down through the annular zone; the foreign matter in the tufts being disentangled and disengaged from the tufts by the air jets and being forced to the outer periphery of said zone; and skimming off the foreign matter therefrom at the outer periphery.

2. The process of claim 1 in which the air jets are delivered at a velocity between 500 and 800 feet per second, at a pressure between two and one-half to five pounds per square inch, and have a cross-sectional area at nozzle of .003 to .0276 square inch.

DAVID G. BLACK.

References Cited in the file of this patent

UNITED STATES PATENTS

| Number | Name | Date |
|---|---|---|
| 1,293,444 | Hubler | Feb. 4, 1919 |
| 1,485,410 | Rackemann | Mar. 4, 1924 |
| 2,090,955 | Taylor | Aug. 24, 1937 |
| 2,100,112 | Taylor | Nov. 23, 1937 |
| 2,491,877 | Schug | Dec. 20, 1949 |

FOREIGN PATENTS

| Number | Country | Date |
|---|---|---|
| 9,904 | Great Britain | of 1889 |